Dec. 29, 1931. E. W. BEREIT 1,838,652
YOKE
Filed Dec. 9, 1929
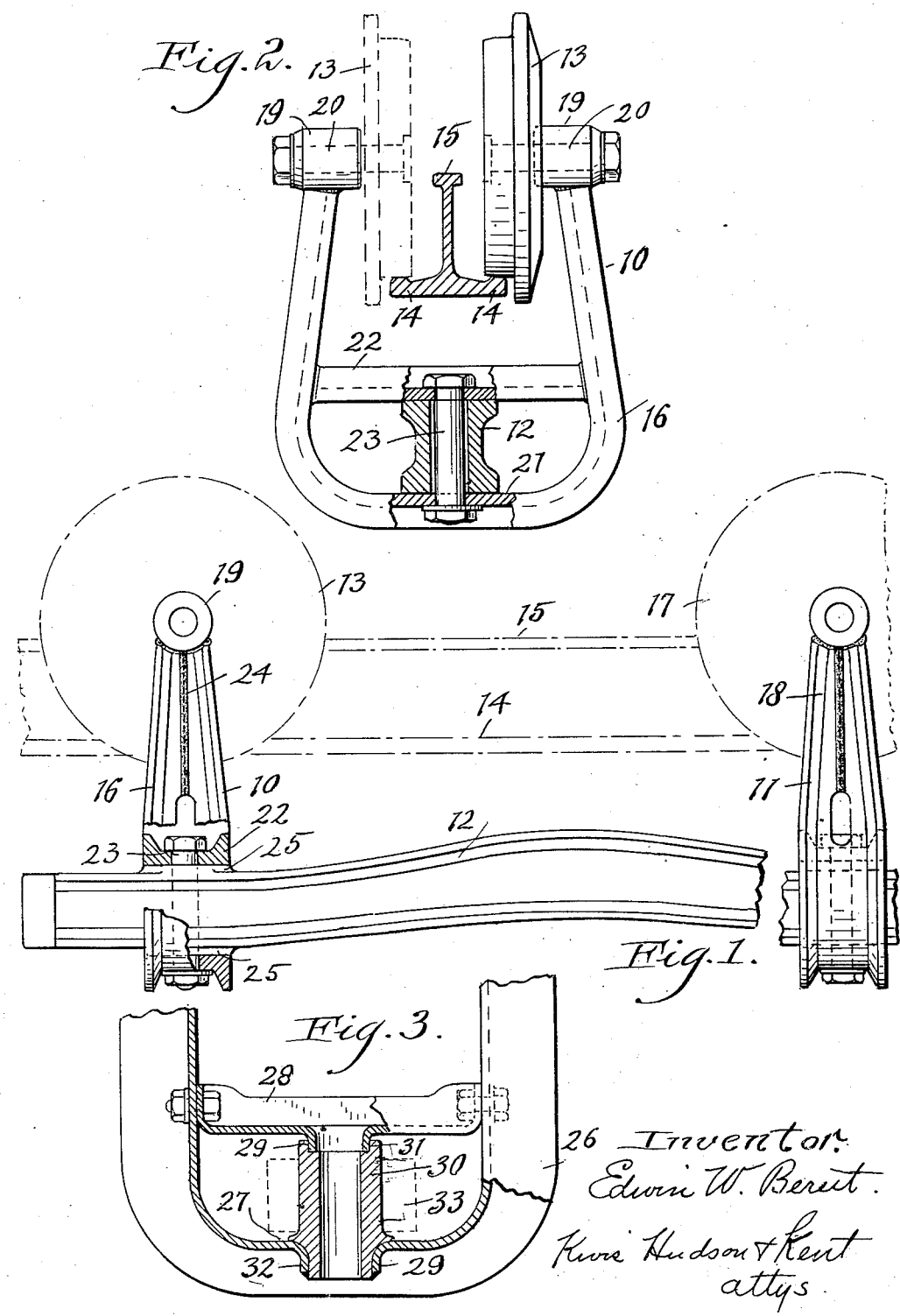

Patented Dec. 29, 1931

1,838,652

UNITED STATES PATENT OFFICE

EDWIN W. BEREIT, OF MENTOR, OHIO, ASSIGNOR TO THE CLEVELAND CRANE & ENGINEERING COMPANY, OF WICKLIFFE, OHIO, A CORPORATION OF OHIO

YOKE

Application filed December 9, 1929. Serial No. 412,638.

This invention relates generally to carriers of the type adapted to travel along a suspended monorail track, and more particularly to a yoke for such carriers.

An object of this invention is to provide an improved form of yoke for traveling carriers.

Another object of this invention is to provide a carrier yoke formed from a bar of rolled stock.

The invention may be further briefly summarized as consisting in certain novel forms of construction and arrangements of parts hereinafter described and particularly set out in the appended claims.

In the accompanying sheet of drawings,

Fig. 1 is a fragmentary side elevational view of a carrier embodying my invention;

Fig. 2 is an end elevational view of the carrier with parts thereof shown in section; and Fig. 3 is a fragmentary elevational view showing another form of carrier embodying my invention.

In the drawings illustrating my invention, I have shown a suspended traveling carrier of the monorail type, but it should be understood, however, that my invention may be applied to carriers of various types. The carrier is provided at the forward and rear ends thereof with supporting heads 10 and 11 which are connected together by means of a horizontally disposed load bar 12. The supporting head 10 comprises a pair of wheels 13 adapted to travel along the laterally extending flanges 14 of the suspended rail 15, and a yoke 16 suspended from the wheels.

The supporting head 11 is similar in construction to the supporting head 10, and comprises a pair of wheels 17 and a yoke 18 suspended therefrom. Since the two supporting heads are identical in construction, reference will be made only to the head 10 in the detailed description.

In carriers of this general type, as heretofore constructed, the yokes have been made in the form of castings, and, due to the rough usage to which carriers of this type are subjected, these castings are frequently broken. In carriers constructed in accordance with my invention, the yokes are formed from bars of rolled stock, such as rolled steel channels, which are bent to appropriate shape. As clearly illustrated in the drawings, the yoke 16 is formed by bending a channel-shaped bar to substantially U-shape. At the ends of the legs of this U-shaped member, bearings 19 are secured, as by welding, to provide suitable wheel mounting means. In the particular form of carrier construction herein illustrated, the bearing members 19 are arranged for suspending the yoke from the wheel axles 20. In forming the U-shaped yoke, the intermediate portion 21 thereof is maintained substantially straight so that the flat back of the channel-shaped bar affords a plane bearing surface for the load bar 12. A strut or reenforcing member 22, preferably formed from channel-shaped rolled stock, is secured in place in spaced relation to the straight intermediate portion of the yoke by welding or otherwise securing the ends of the strut to the legs of the yoke. Aligned openings are formed through the strut, and through the intermediate straight portion of the yoke, which are adapted to receive a king pin 23 for pivotally retaining the load bar 12 in place.

In constructing the yoke 16 from a bar of rolled stock, according to my invention, portions of the web are notched out adjacent the ends of the bar. The openings thus formed in the web are closed by bending the flanged portions of the bar toward each other. The portions of the web thus brought together along the line 24, shown in Fig. 1, are preferably secured together by welding along this line. The depth of the channel-shaped bar which forms the yoke is thus reduced at its end portions, which facilitates connecting the bearings 19 to the yoke. In reducing the depth of the end portions of the channel bar, it should be noted that only web portions are cut out, thus leaving ample metal in the thick flanges to support the desired load.

Any suitable load bar may be used with the form of head construction which I have described, but in the carrier illustrated in the drawings, I have shown the load bar 12 in the form of a beam of suitable size and material. Openings are provided through the bar, adjacent the ends thereof, which openings register with the aligned openings through the strut 22 and the intermediate straight portion of the yoke, to receive the king pins 23. Flat bosses 25 may be provided around the openings through the load bar to provide bearing surfaces for contact with the surface of the strut and with the flat intermediate portion of the yoke when the bar is pivotally secured in place by the king pins.

In Fig. 3 of the drawings, I have shown another form of construction in which a substantially U-shaped yoke 26 is formed by bending a bar of channel-shaped stock so as to provide a substantially straight intermediate portion 27. An opening formed through the web of this intermediate straight portion aligns with an opening formed through the reenforcing member or strut 28 which is bolted in place between the legs of the yoke in spaced relation to the intermediate straight portion. In forming the openings through the strut and through the intermediate straight portion, the metal which is displaced forms collars 29 around these openings, which collars assist in holding the bearing block 30 in place.

The collar of the strut extends into a countersunk recess 31 provided in one end of the bearing block, while the collar of the intermediate portion of the yoke surrounds the reduced end portion 32 at the lower end of the bearing block. After the load bar 33 is assembled in place over the bearing block, a king pin may be inserted through the aligned openings of the strut, the bearing block, and the intermediate portion of the yoke.

It will now be readily seen that I have provided a strong and durable form of carrier yoke adapted to be cheaply made from bars of rolled stock which are readily accessible in all desired sizes. In constructing the yoke from rolled stock in this manner, the expense of making patterns and molds is entirely eliminated, and, furthermore, in actual use the yokes of my invention are not so apt to be broken as are yokes constructed of cast metal.

While I have shown and described the device of my invention in a detailed manner, it should be understood that I do not intend to limit myself to the precise details shown and described but regard my invention as including such changes and modifications as do not involve a departure from the spirit of the invention and the scope of the appended claims.

Having thus described my invention, I claim:

1. A yoke comprising a bar of channel-shaped cross-section bent to substantially U-shape, and wheel supporting means rigidly secured at the ends of said bar.

2. A yoke for a carrier, comprising a bar being reduced at the end portions of said bar, and means attached to said reduced end portions for suspending the yoke from the wheels of the carrier.

3. A yoke comprising a rolled channel bar bent to substantially U-shape, portions of the web of said bar being cut out and closed to provide end portions of reduced depth, and wheel mounting bearing means welded to said reduced end portions.

4. A yoke comprising a rolled channel bar bent to substantially U-shape, portions of the web of said bar being cut out and closed to provide reduced end portions, the meeting edges of said web being welded together, and wheel mounting means secured to said reduced end portions.

5. A yoke comprising a substantially U-shaped member formed from a bar of rolled stock, wheel mounting means carried at the ends of said bar, and a strut secured between the legs of said member, said strut and said member having aligned openings adapted to receive a pin.

6. A yoke for a carrier, comprising a substantially U-shaped member formed from a bar of rolled stock and having a substantially flat intermediate portion, means at the ends of said bar for suspending the yoke from the wheels of the carrier, and a strut secured between the legs of said member in spaced relation to said intermediate portion, said strut and said intermediate portion having aligned openings adapted to receive a pin.

7. A yoke comprising a bar of rolled stock bent to substantially U-shape, wheel mounting means at the free ends of said bar, and reenforcing means extending between the uprightly disposed portions of said bar, said reenforcing means being welded to said uprightly disposed portions.

8. A yoke comprising a bar of rolled stock bent to substantially U-shape, wheel mounting bearing members welded to the free ends of said bar, and a reenforcing member secured between the uprightly disposed portions of said bar.

9. A yoke comprising a substantially U-shaped member formed from a bar of rolled stock, reenforcing means extending between the legs of said member and welded thereto, and wheel mounting bearing members welded to the free ends of said member.

In testimony whereof, I hereunto affix my signature.

EDWIN WM. BEREIT.